(No Model.)
F. W. B. McCREEDY.
RUBBER ERASER.
No. 417,073.   Patented Dec. 10, 1889.
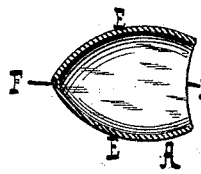
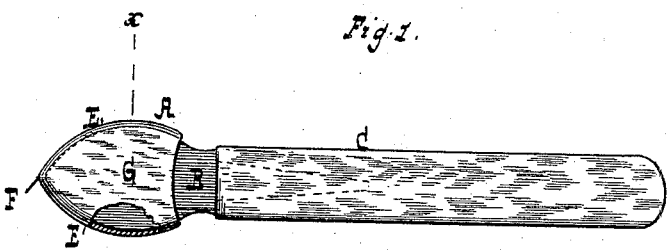
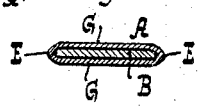
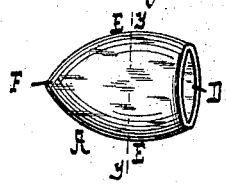
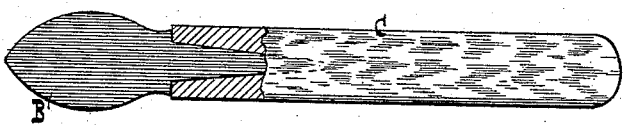
WITNESSES:
William Miller
Oscar A. Michel
INVENTOR:
Franklin W. B. McCreedy
BY Van Santvoord & Hauff
ATTORNEYS

UNITED STATES PATENT OFFICE.

FRANKLIN W. B. McCREEDY, OF NEW YORK, N. Y.

RUBBER ERASER.

SPECIFICATION forming part of Letters Patent No. 417,073, dated December 10, 1889.

Application filed August 22, 1889. Serial No. 321,612. (No model.)

*To all whom it may concern:*

Be it known that I, FRANKLIN W. B. MC-CREEDY, a subject of the Queen of Great Britain, residing at New York, county and State of New York, have invented new and useful Improvements in Rubber Erasers, of which the following is a specification.

This invention relates to rubber erasers; and it consists in certain novel features, which are set forth in the following specification and claim, reference being had to the accompanying drawings, in which—

Figure 1 shows my rubber eraser applied to a flat stock. Fig. 2 is a section on line $x$ $x$ of Fig. 1. Fig. 3 shows a central longitudinal section of the rubber pocket of the eraser seen in Fig. 1 detached. Fig. 4 is another form of stock. Fig. 5 is an outside view of a pocket detached, adapted to the form of stock shown in Fig. 4. Fig. 6 is another form of rubber eraser placed upon a stock of a different form from the others. Fig. 7 is a cross-section on the line $y$ $y$ of Fig. 5.

Similar letters indicate corresponding parts.

This invention relates to rubber ink and pencil erasers; and it consists of a flattened hollow rubber eraser A, into which is inserted a stock B of appropriate form, to which is connected a handle C. The rubber eraser A is molded in the shape represented in the drawings, forming a hollow pocket D, when seen detached from its stock. It is applied to its stock B by springing or stretching it over the stock, which fills it snugly, the sides of the pocket on being released contracting, so as to clasp the convex edges and point of the stock and conform to its shape. To insure a close fit of the rubber pocket on the stock, the stock is made with convex edges, and is a little wider than the pocket. The rubber eraser or pocket is of such shape that its edges E E and point F are thin, being narrowed down similar in shape to a convex knife-edge, for the purpose of enabling the rubber eraser to be applied to angles and corners of work on which it is used and to fine lines and lines adjacent to each other.

The flattened faces G G of the eraser give to it a broad erasive surface.

The rubber eraser can be modified in form with various degrees of sharpness at its end without departing from my invention, including what is commonly called a "pencil-point," as is illustrated in the drawings.

The eraser can be secured to its stock by applying mucilage to the faces of the stock before the rubber-pocket is sprung thereon, thereby aiding the grasp on the stock which is made by the contractile force of the rubber, and can be applied to lead-pencils, pen-holders, and similar articles.

The stock B of the handle C being flat or flattened on each side, as shown, and provided with opposite convex edges terminating in a pointed extremity, serves to impart to the flexible and elastic pocket or hollow rubber eraser D the required form to provide the flat sides G, convex edges E, and point F.

I am aware that an eraser has been composed of a handle having a tenon fitting a recess in a conical piece of rubber; but such does not constitute my device. I am also aware that a ring of rubber V-shaped in cross-section has been sprung around a circular block or center-piece; but neither does such constitute my device.

What I claim as new, and desire to secure by Letters Patent, is—

The eraser herein described and shown, composed of the handle C, having the stock B, formed with flattened opposite sides and opposite convex edges, terminating in a pointed extremity, and the hollow rubber eraser or pocket D, wholly inclosing the stock and shaped to conform therewith to provide the opposite flattened sides G and the opposite convex edges E, terminating in the point F, substantially as described.

In testimony whereof I have hereunto set my hand in the presence of two subscribing witnesses.

FRANKLIN W. B. McCREEDY.

Witnesses:
J. VAN SANTVOORD,
W. HAUFF.